Aug. 18, 1959  D. J. YEADON ET AL  2,899,994
APPARATUS FOR STRIPPING BARK
Filed May 6, 1957  5 Sheets-Sheet 1
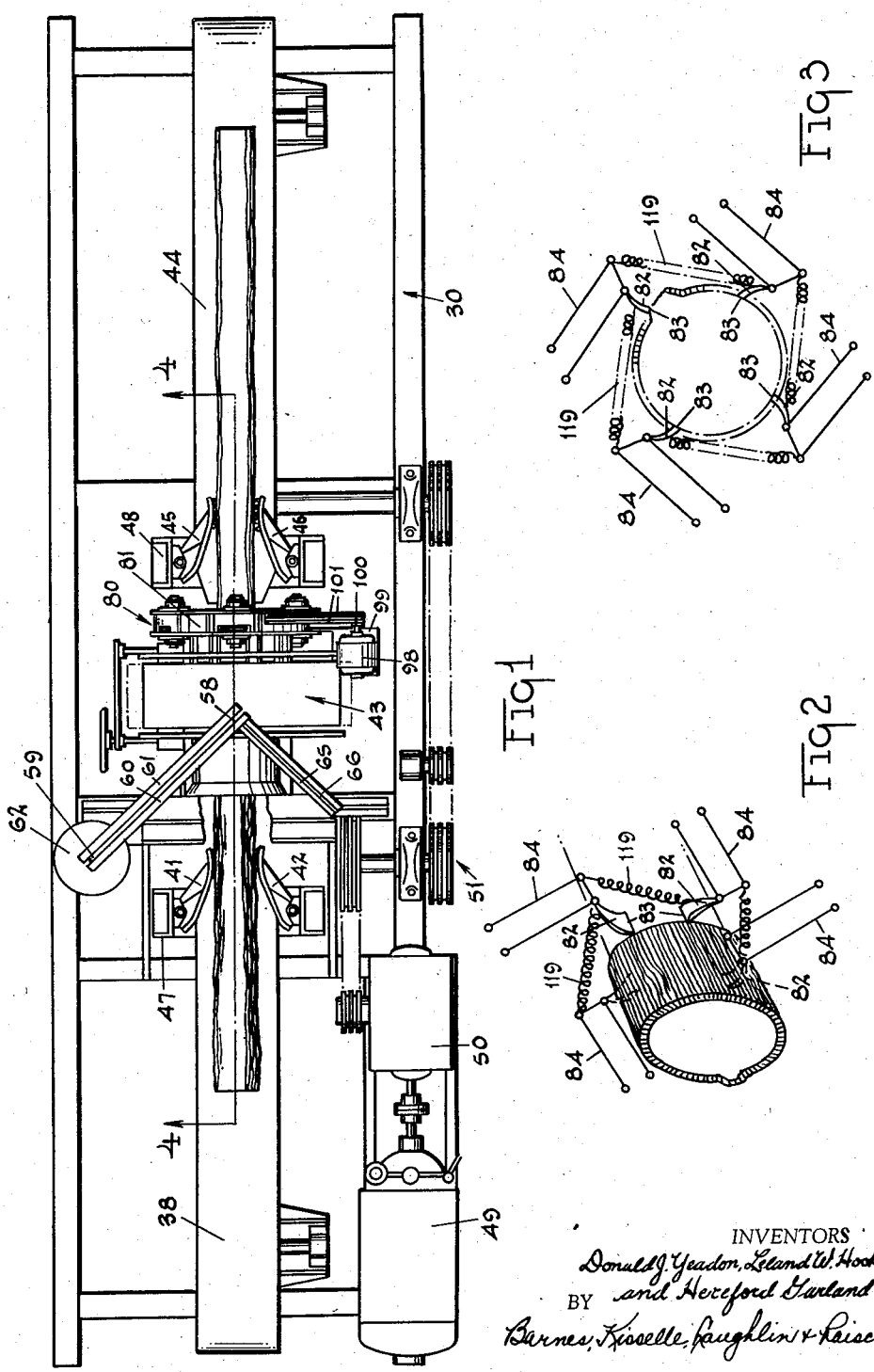
INVENTORS
Donald J. Yeadon, Leland W. Hooker
BY and Hereford Garland
Barnes, Kisselle, Laughlin & Raisch
ATTORNEYS

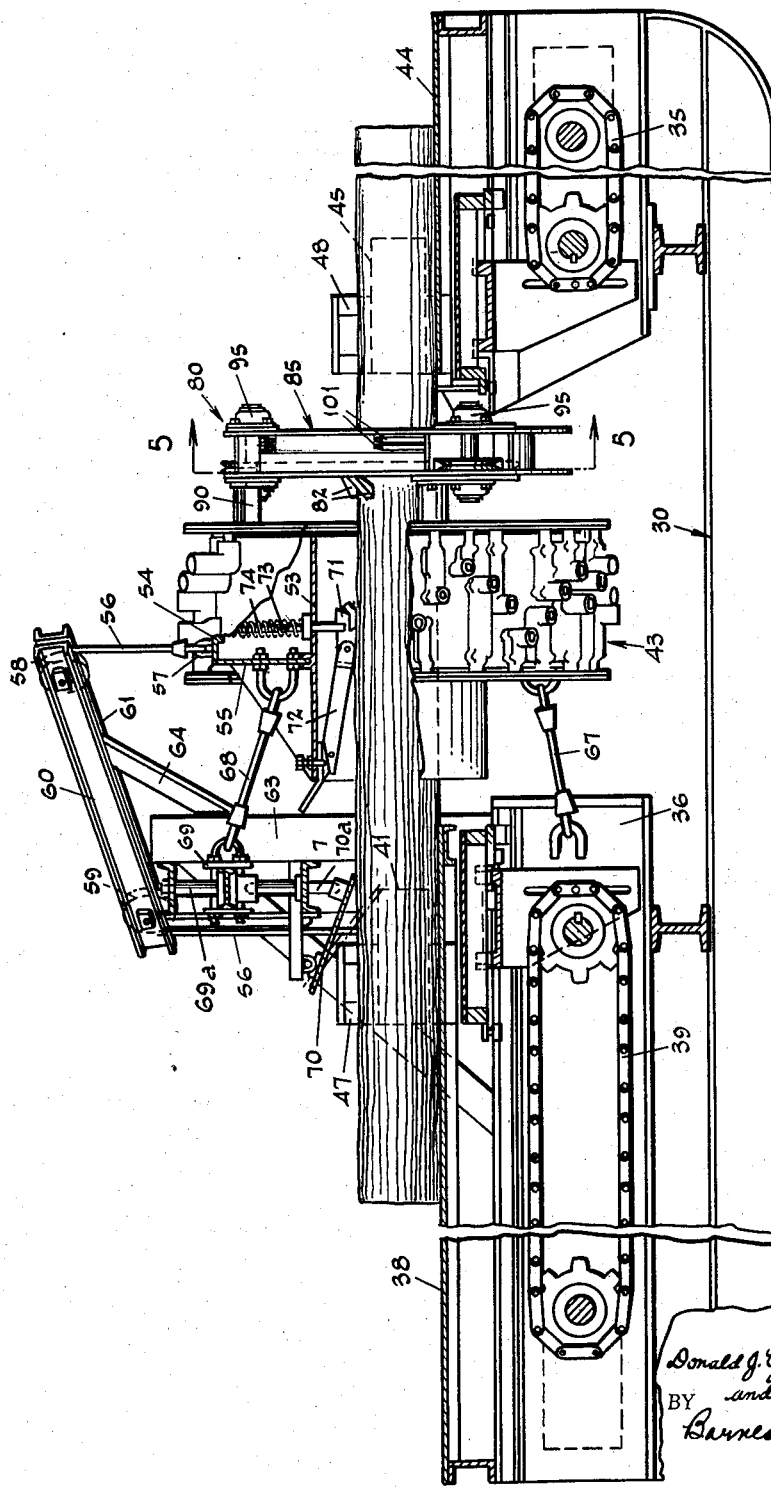

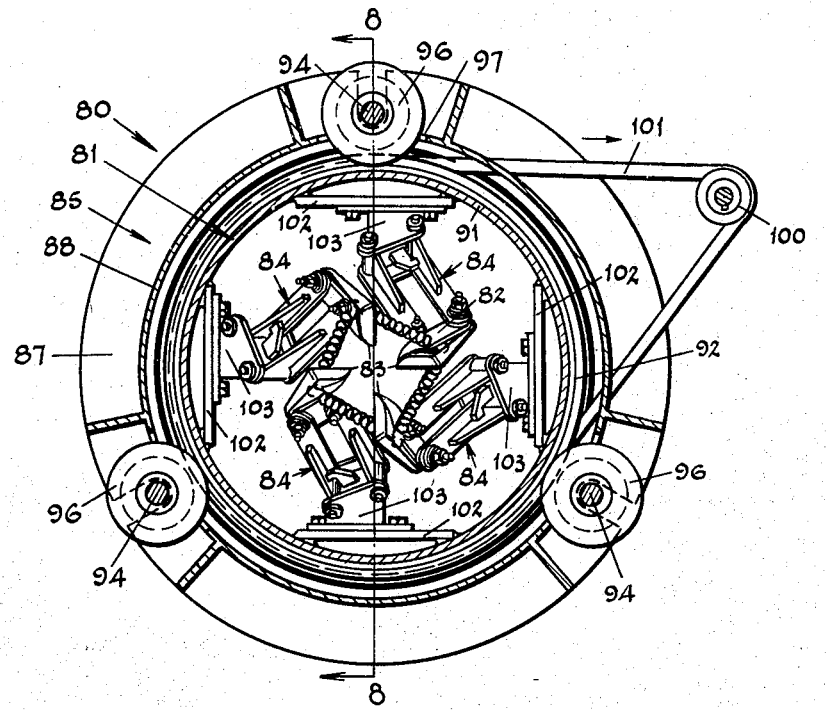
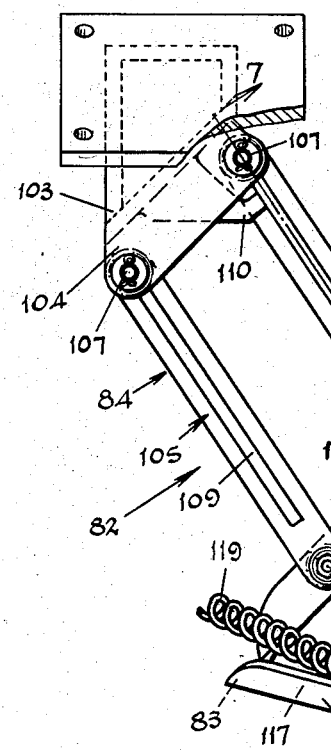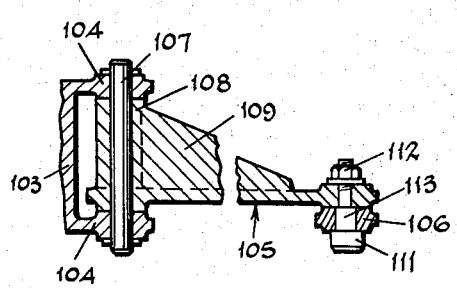

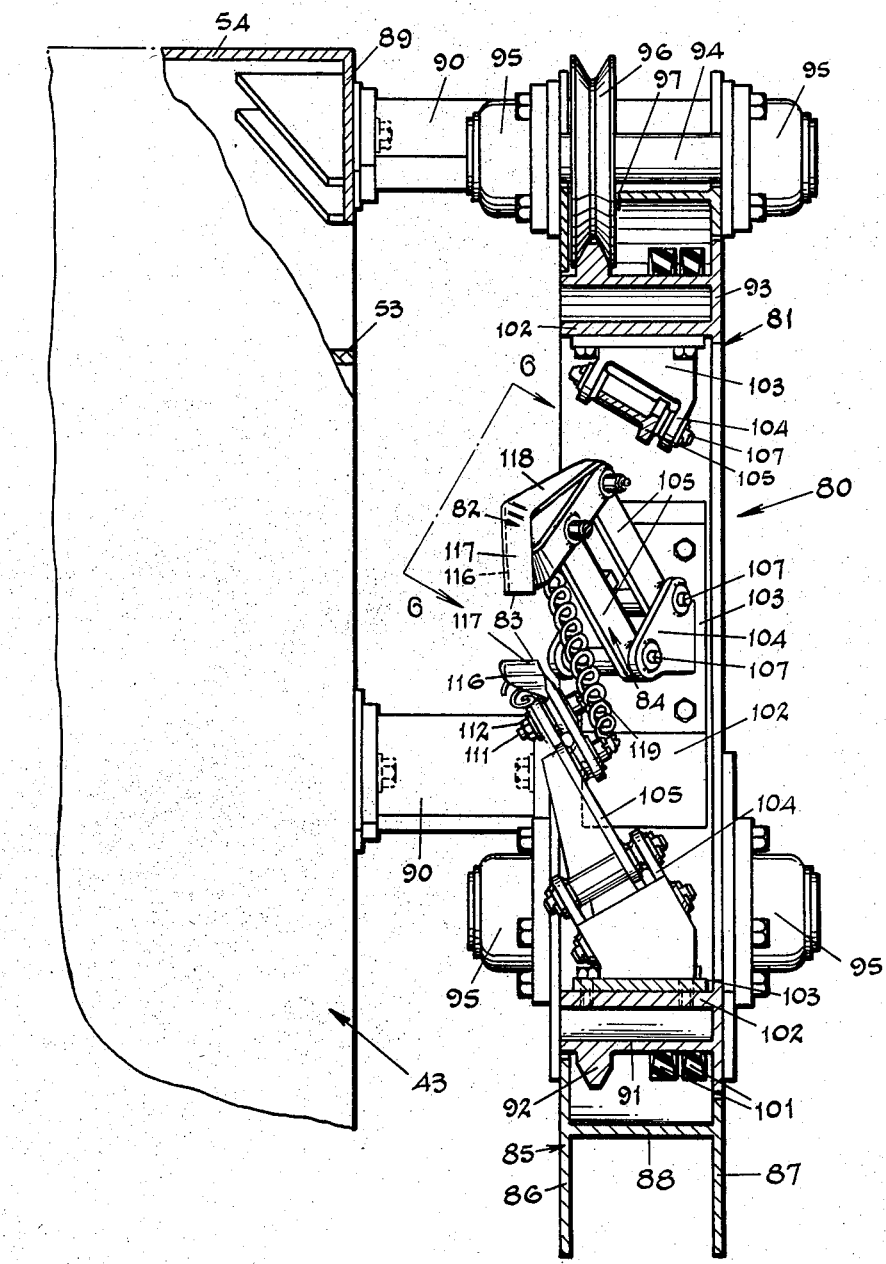

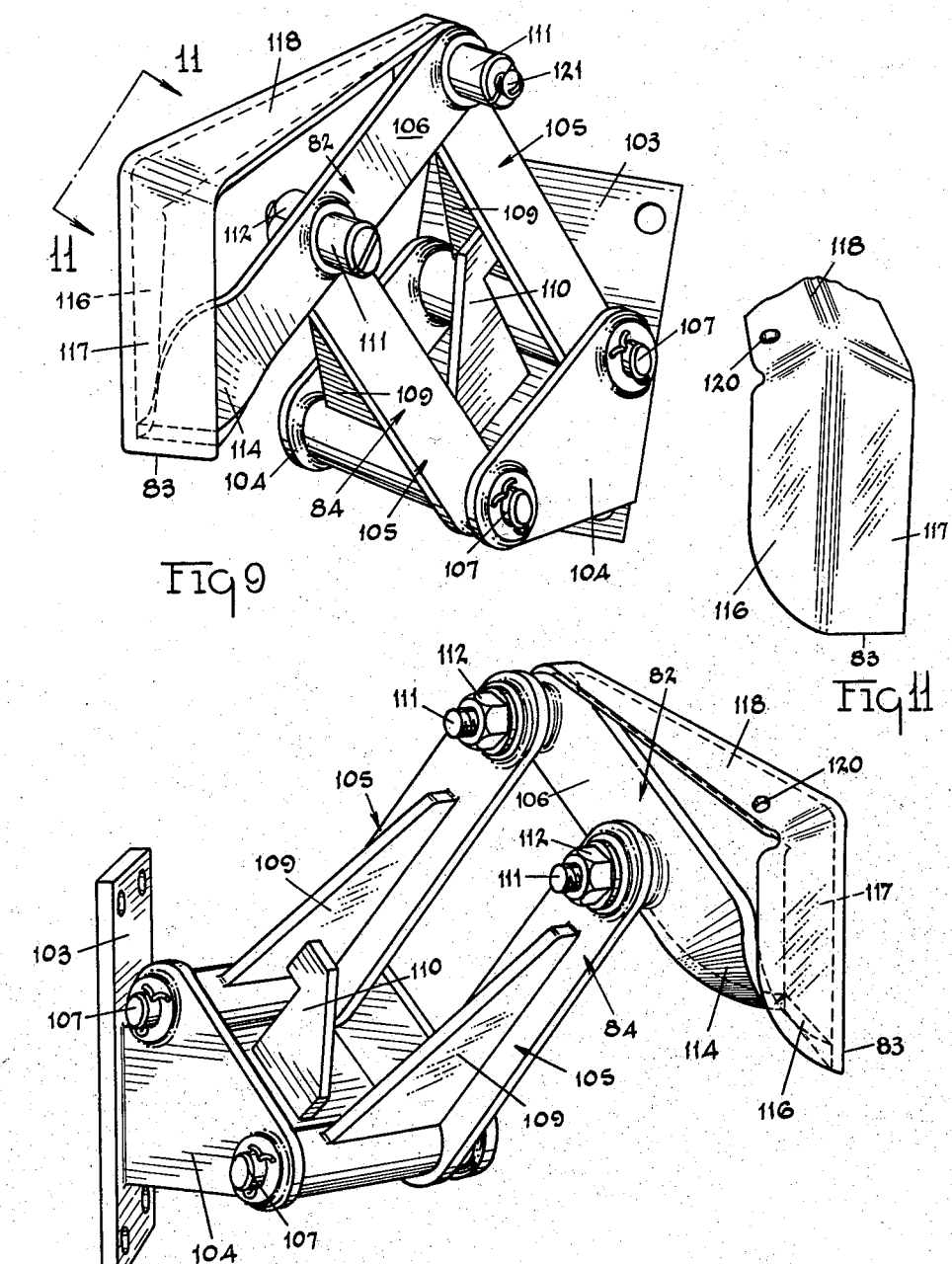

United States Patent Office 2,899,994
Patented Aug. 18, 1959

2,899,994

APPARATUS FOR STRIPPING BARK

Donald J. Yeadon, Menominee, Leland W. Hooker, and Hereford Garland, Houghton, Mich., assignors to Board of Control of the Michigan College of Mining and Technology Application May 6, 1957, Serial No. 657,435

15 Claims. (Cl. 144—208)

This invention relates to an apparatus for stripping bark from logs such as pulpwood sticks.

In the patent to Yeadon et al., No. 2,691,395, issued October 12, 1954, and in the copending application of Yeadon et al., Serial No. 509,302, filed May 18, 1955, now issued as Patent No. 2,802,497, dated August 13 1957, titled "Apparatus for Stripping Bark," there are disclosed and claimed improved methods and apparatus for stripping bark from logs. Such methods and apparatus are very effective in the removal of bark from logs such as pulpwood sticks. However, in some instances the bark may remain connected to the log even though it has been loosened by the bark-stripping apparatus. This may occur in the spring and fall seasons when the bark is tight.

It is therefore an object of this invention to provide a bark-stripping apparatus which will efficiently remove the bark throughout all the seasons of the year.

It is a further object of the invention to provide an auxiliary apparatus which may be used with the apparatus shown in the afore-mentioned patent and patent application to insure the removal of bark from logs during all seasons of the year.

In the drawings:

Fig. 1 is a plan view of the bark-stripping apparatus, parts being broken away.

Fig. 2 is a diagrammatic perspective view illustrating the operation of the bark-stripping apparatus of this invention.

Fig. 3 is an end view of the arrangement illustrated in Fig. 2.

Fig. 4 is an enlarged, fragmentary, longitudinal vertical section taken along the line 4—4 in Fig. 1.

Fig. 5 is a vertical sectional view on a further-enlarged scale taken along the line 5—5 in Fig. 4.

Fig. 6 is a fragmentary view on an enlarged scale of a portion of the stripper mechanism.

Fig. 7 is a fragmentary sectional view taken along the line 7—7 in Fig. 6, parts being broken away.

Fig. 8 is a fragmentary, vertical sectional view on a further-enlarged scale taken along the line 8—8 in Fig. 5.

Fig. 9 is a view on an enlarged scale of a portion of the apparatus shown in Fig. 8.

Fig. 10 is a side elevation of the apparatus shown in Fig. 9.

Fig. 11 is a fragmentary view taken along the line 11—11 in Fig. 9.

The machine illustrated in the drawings is, with the exception of stripper head 80, shown and described in detail in the aforementioned copending application of Yeadon et al., Serial No. 509,302, filed May 18, 1955. Thus, the general arrangement of the machine will be described here only to the extent necessary to afford a clear understanding of the invention herein.

As is best illustrated in Fig. 4 the machine includes a base 30 formed of structural members on which are supported horizontally aligned tables 38 and 44 and between which are arranged a knife head 43 and a stripper head 80. As shown in Fig. 1 a pair of jaws 41, 42 adapted to grip the log and move it along the table 38 is mounted on a carriage 47 for reciprocating movement longitudinally of the table, gripping the logs when moved in one direction and releasing the grip on the logs when moved in the reverse direction. A chain-and-sprocket drive 39 reciprocates the carriage 47. A pair of jaws 45, 46 on a carriage 48 is provided for longitudinal movement along the table 44 for pulling the log along the table.

The carriage 48 is driven by a chain-and-sprocket drive 35. Mechanism is associated with the carriage 47 and jaws 41, 42 to open the jaws when the carriage is moving away from the knife head 43 and to close the jaws when the carriage is moving toward the knife head 43. A similar mechanism is associated with the carriage 48 to open the jaws 45, 46 when the carriage moves toward the knife head 43 and to close the jaws 45, 46 when the carriage is moved away from the knife head 43. The chain-and-sprocket drives 39 and 35 are driven by a motor 49 through a speed reducer 50 and endless belt linkages generally designated 51 (Fig. 1).

As shown in Fig. 4, the knife head 43 comprises spaced, coaxial, cylindrical walls 53, 54. The forward or discharge edges of these cylindrical walls lie in a single plane while the inner cylindrical wall 53 is longer than the outer wall 54, projecting toward the rear of the machine, that is, to the left as viewed in Figs. 1 and 4. An annular ring 55 is fastened to the cylindrical walls to complete the housing for the knife head.

The knife head is mounted for transverse movement relative to the longitudinal axis of the machine by a cable 56 secured at one end to a bracket 57 on the top of the outer cylindrical wall 54. The cable 56 passes over pulleys 58, 59, rotatably mounted between two channel sections 60, 61. A counterbalance weight 62 is fastened to the other end of the cable 56. The channel sections 60, 61 extend upwardly and forwardly of the machine and are supported by a vertical strut 63 and brace 64 on the one side of the machine, and an upwardly extending member 65 welded to a vertical strut 66 on the other side of the machine. A pair of thrust cables 67 is connected between I beams 36 on the base 30 and the knife head 43, only is one of the cables being shown in Fig. 4.

Means are provided for adjusting the vertical position of the knife head relative to the tables 38 and 44 to accommodate different-sized logs. These means include a pair of thrust cables 68 connected at one end to the knife head 43 and at the other end to a member 69 arranged for vertical sliding movement on a guide 69a. A gate 70 is pivotally mounted in the path of the logs and extends downwardly and forwardly in the direction of movement of the logs through the knife head. The free end of the gate is operatively connected to the slidable member 69 by a pivoted link 70a so that, when the gate is contacted by the leading end of an oncoming log, the gate is swung upwardly, causing the link 70a to shift the slidable member 69 upwardly, whereupon the rear end of cables 68 are likewise shifted upwardly. The free end of gate 70 will move a distance vertically of the axis of the log equal to the amount that the diameter of the log exceeds the initial gap between the forward end of the gate and the table. This movement of the gate produces an upward movement of the member 69 such that, as the knife head aligns itself axially with the log, as the log passes through it, cables 68, 67 are aligned symmetrically with respect to the axis of the log and therefore substantially the same amount of tension is applied to both sets of thrust cables. Thus, no radial unbalanced forces are applied to the knife head.

As shown in Fig. 4, the knife head 43 supports a plurality of knives 71, each of which is movable radially of the knife head, the movement being controlled by an arm 72 pivotally mounted on the inner cylindrical wall 53. Each knife is individually biased to swing radially inwardly of the knife head by a spring 73 supported on a guide rod 74. Means are provided for adjusting the tension on the spring. The details of the above-described structure are completely and fully shown and described in the afore-mentioned copending application.

According to the present invention, a stripper head 80 is supported on the knife head 43. The stripper head 80 includes an annular rotor 81 which is rotatably supported in the stripper head and continuously rotated when the bark-stripping apparatus is in operation, as more fully described below. The rotor 81 supports a plurality of circumferentially spaced stripper members 82 which are mounted on the rotor for yielding movement generally radially thereof to accommodate logs of different sizes.

The operation of the strippers in insuring the removal of the bark which has been initially slitted by the knives 71 on the head 43 is shown diagrammatically in Figs. 2 and 3. The strippers 82 having axially extending edges 83 are supported for radial movement by parallelogram linkages 84. Springs 119 extending between the parallel linkages 84 of adjacent strippers yieldingly urge the strippers radially inwardly. After passing through the knife head 43 where the bark is slitted, a log passes through the rotor 81, which is continuously rotating, causing the strippers 82 to ride along the surface of the log and strip the slitted bark therefrom.

Referring to Figs. 5–8, the specific structure of stripper head 80 includes a support 85 comprising spaced annular walls 86, 87 connected by a cylindrical wall 88. The support 85 is mounted on an inwardly extending flange 89 of the knife head 43 by means of circumferentially spaced angle members 90. The rotor 81 comprises a hollow cylinder 91 having a V-shaped track 92 on the outer surface thereof. In addition, the rotor 81 includes an annular rim 93. Shafts 94 are rotatably mounted at circumferentially spaced points on the support 85 by bearings 95. A pulley 96 is mounted on each shaft 94, the periphery of each pulley serving as a rotatable support and guide for the track 92 of rotor 81. The cylindrical wall 88 of support 85 is provided with slots 97 adjacent each pulley 96 through which the pulley projects radially inwardly to engage the track 92 on the rotor 81 (Fig. 5).

As shown in Fig. 1, a motor 98 is mounted on a bracket 99 fixed to the knife head 43. Pulleys 100 are mounted on the motor shaft and endless belts 101 are trained over the pulleys 100 and the outer surface of cylinder 91 to provide a means for rotating the rotor 81 within the support 85 and about the axis of knife head 43.

As shown in Fig. 5, plates 102 are welded to the inner surface of cylinder 91 of the rotor 81 at circumferentially spaced points. Each plate has the plane thereof parallel to the axis of rotor 81. A bracket 103 is bolted to each plate 102, as shown in Figs. 5 and 8–10. Each bracket 103 includes a yoke formed by spaced legs 104. Parallel spaced arms 105 are pivotally connected at one end thereof to the legs 104 and at the other end thereof to the stripper 82.

As shown in Fig. 7, each arm 105 is pivotally mounted on a pin 107 extending between the legs 104. The pin 107 passes through a hub 108 on the arm 105. Each arm 105 also includes a web 109 extending from the arm 105 to the hub 108 and serving to reinforce the arm. A stop 110 is mounted on each yoke in the path of one of the webs 109 for engaging the web and limiting the inward movement of each arm 105. As further shown in Fig. 7, each stripper 82 is pivotally mounted on the ends of the arms 105 by bolts 111 extending through a portion 106 of the stripper 82 and arms 105 and having a nut 112 threaded on each bolt 111. Each bolt 111 includes an intermediate enlarged portion 113 which has a shoulder which abuts against its respective arm 105. The surface of each enlarged portion 113 provides a pivotal mounting for the stripper 82. The arms 105 together with legs 104 of bracket 103 and the portion 106 of stripper 82 between the bolts 111 provide the parallelogram linkages 84 referred to previously in connection with Figs. 2 and 3.

Referring to Fig. 9, a free end portion 114 of each stripper 82 is bent or twisted out of the plane of the stripper to provide the straight edge 83 which extends generally axially of the rotor 81 (Fig. 8).

Referring to Figs. 6 and 8–10, each stripper 82 is provided with a surface 116 which extends radially outwardly from the rear of stripper edge 83, that is, the edge which is first encountered by an oncoming log. The surface 116 lies in a plane extending radially outwardly and rearwardly from the plane of rotor 81 and preferably forms an angle of approximately 10° with the plane of the rotor (Fig. 8). An oncoming log strikes the surfaces 116 of each stripper camming the strippers outwardly and causing the stripper edges 83 to ride over the end of the log into contact with the periphery of the log. In other words, these surfaces 116 when rotating define a cone having an obtuse apex angle and inclined rearwardly in the direction of the oncoming logs at an angle of about 10° to the radial plane of the rotor (Fig. 9). Each stripper is also provided with a surface 117 integrally connected with the surface 116 and extending radially outwardly from the stripper edge 83. The surface 117 lies in an axially extending plane which contains the longitudinal axis of rotor 80. A reinforcing angle member 118 extends from the radially outer ends of surfaces 116, 117 to that end of stripper 82 which is opposite stripper edge 83.

The coil springs 119 are provided between the parallelogram linkages for yieldingly urging the strippers radially inwardly. As shown in Figs. 5, 6, 9 and 10, one end of each spring 119 is hooked to an opening 120 in the strut 118 and the other end is hooked on a screw 121 threaded in the end of one of the bolts 111 on the next adjacent stripper.

In operation the entire machine shown in Fig. 1 is set in operation and logs are delivered to the table 38. The logs are fed by the jaws 41, 42 and the jaws 45, 46 through the knife head 43 and stripper head 80. When an oncoming log strikes the gate 70, cables 67, 68 align themselves symmetrically with respect to the axis of the log. As the end of the log enters the knife head 43, the knife head is shifted vertically into axial alignment with the log by the funneling action of the knife-supporting arms 72. The stripper head 80 is thus likewise brought into axial alignment with the log. The knives 71 of knife head 43 serve to slit the bark in the manner more fully shown and described in the afore-mentioned patent and patent application of Yeadon et al.

The forward end of the log, after passing through the knife head 43, approaches the stripper head 80. During this time, the rotor 81 carrying the strippers 82 is continuously rotating in the stripper head 80. The end of an oncoming log strikes the radially arranged surfaces 116 of the strippers, camming the strippers outwardly and causing the stripper edges 83 to ride over the end of the log into contact with the periphery of the log. The faces 116 extend radially outwardly a distance sufficient to insure contact with the periphery of the largest-diameter log which is contemplated.

The side faces 117 of the strippers engage the strips of slitted bark and displace them circumferentially of the log. Thus, the continuously rotating strippers complete the process of stripping the bark from the periphery of the log and insure that the bark which as been loosened but not completely removed by the knife head 43 is completely removed. Thus, even in those seasons when the bark is tight, such as spring and fall, the apparatus insures complete removal of the bark. The parallelogram linkage 84 formed by the bracket 103 and arms 105 maintains the knife edge 83 in an axial direction regardless of the diameter of the log which is being acted upon.

The provision of the plane of the arms 105 as extending rearwardly and inwardly at an angle of about 45° with the axis of the rotor and with the plane of the rotor provides a sufficiently strong structure which will withstand the forward thrust of the logs through the stripper head 80. The radial faces 116 of the strippers 82 preferably have the lower edge thereof adjacent the edge 83 curved to permit the knife edge to move radially inwardly rapidly after it rides over a knot or other irregularity in the surface of the log.

We claim:

1. In an apparatus for stripping bark from a log comprising a support, a vertically shiftable knife head on said support, said knife head including a plurality of knives arranged circumferentially around said head and adapted to slit the bark longitudinally as a log is moved through said head, and means for shifting the knife head vertically on said support into axial alignment with an oncoming log, the improvement which comprises an annular rotor member, means for rotatably supporting said rotor member on said knife head with the axis thereof in alignment with the axis of said knife head, whereby said rotor member is shifted vertically when said knife head is shifted vertically into axial alignment with an oncoming log, means for rotating said rotor member, and a plurality of strippers mounted on said rotor member and adapted to contact the slitted bark on a log moved through said member to insure separation of bark from such a log when the rotor is rotated.

2. In an apparatus for insuring the removal of bark from a log after such log has been acted upon by a bark-slitting machine, the combination comprising an annular rotor member, means for supporting said annular rotor member for rotation about its axis, means for rotating said annular rotor member, means for moving a log axially through said annular rotor member, a plurality of strippers, each said stripper having an edge extending generally axially, means for mounting each said stripper on said rotor member for yielding movement in a direction generally radially of said rotor member, said latter means including means for maintaining the stripper edge of each stripper generally parallel to the axis of said rotor member throughout the radial movement of said stripper, said means for mounting each said stripper on the rotor member comprising a pair of spaced parallel arms pivotally mounted on said rotor member at one end thereof and pivotally connected to said stripper at the other end thereof, thereby forming a parallelogram linkage between each said stripper and said rotor member.

3. The combination set forth in claim 2 wherein said parallel arms contain a plane disposed at an angle to the axis of said rotor member and to a radial plane of said rotor member, said plane of said arms extending rearwardly and inwardly relative to an oncoming log.

4. The combination set forth in claim 3 wherein each said means for mounting a stripper on the rotor member includes a coil tension spring extending between adjacent parallelogram linkages and yieldingly urging said linkages in a direction tending to move the stripper edges radially inwardly.

5. The combination set forth in claim 3 wherein each said stripper is provided with a radially extending surface at the rear edge of said stripper edge adapted to be contacted by the end of an oncoming log and ride up over the end of a log, said radially extending surface lying in a plane forming an angle of about 10° with said radial plane and extending radially outwardly and rearwardly relative to an oncoming log.

6. The combination set forth in claim 2 wherein said parallel arms contain a plane which forms an angle of about 45° with the axis of said rotor member and about 45° with a radial plane of said rotor member.

7. In an apparatus for insuring the removal of bark from a log after such log has been acted upon by a bark-slitting machine, the combination comprising a rotor member including a hollow open-ended cylinder, a track comprising an annular ring on the outer surface of said cylinder, a support, trunnions circumferentially spaced on said support and engaging said track thereby rotatably mounting said rotor in said support, means for rotating said rotor, a plurality of circumferentially spaced brackets mounted on the inner surface of said cylinder of the rotor, a stripper individual to each said bracket, a pair of spaced parallel arms individual to each bracket, each said arm pivotally connected at one end to its respective bracket and at the other end to its respective stripper, each said stripper having a straight stripping edge, each said pair of arms containing a plane forming an angle with the axis of said rotor and an angle with a radial plane of said rotor and extending rearwardly and inwardly relative to an oncoming log, said stripping edge of each said stripper being generally parallel to the axis of said rotor throughout the radial movement of said stripper, and a spring connected to each said stripper and yieldingly urging each said stripper radially inwardly.

8. The combination set forth in claim 7 wherein the angle which the plane contained by each pair of arms forms with the axis of said rotor is about 45° and the angle which the plane contained by each pair of arms forms with the radial plane of the rotor is about 45°.

9. In a bark-stripping machine, means for insuring separation of bark from a log after such bark has been slitted longitudinally comprising a rotatable head, a plurality of strippers on said head, means for supporting the strippers for movement radially of said head, means for biasing said strippers in a radially inwardly direction, said strippers being arranged to bear against such bark of a log moved axially through said head, means for rotating said head in one direction whereby the strippers separate bark from such a log, said strippers being provided with radially extending faces which cooperate to present a funnel to the oncoming end of a log whereby when said faces engage the oncoming end of a log, the strippers move radially outwardly to a position wherein their radially inner ends ride up over the oncoming end of a log and engage any longitudinally slitted bark thereon, said funnel having an obtuse apex angle.

10. In a bark-stripping machine, means for insuring separation of bark from a log after such bark has been slitted longitudinally comprising a rotatable head, a plurality of strippers on said head, means for supporting the strippers for movement radially of said head, means for biasing said strippers in a radially inwardly direction, said strippers being arranged to bear against such bark of a log moved axially through said head, means for rotating said head in one direction whereby the strippers separate bark from such a log, the supporting means for the strippers comprising a plurality of brackets arranged circumferentially around said head and a plurality of arms pivotally supported at one end on said brackets and supporting said strippers at their opposite ends, said arms extending from said brackets in a direction rearwardly relative to an oncoming log and in the direction of rotation of said head.

11. The combination set forth in claim 10 wherein said arms are positioned in such a manner that each said stripper is movable in a plane which forms an angle of about 45° with the axis of the rotor and an angle of about 45° with a radial plane of the rotor.

12. In a bark-stripping machine, means for insuring separation of bark from a log after such bark has been slitted longitudinally comprising a rotatable head, a plurality of strippers on said head, means for supporting the strippers for movement radially of said head, means for biasing said strippers in a radially inwardly direction, said strippers being arranged to bear against such bark of a log moved axially through said head, means for rotating said head in one direction whereby the strippers separate bark from such a log, each said stripper including an axially extending stripping edge, and a pair of surfaces extending from said edge, one said surface extending radially outwardly from said stripper edge and being parallel to the axis of said head, the other said surface extending radially outwardly from the rear of said stripper edge and containing a plane perpendicular to said one surface; said other surface being inclined only slightly to a radial plane of said head in a rearward direction relative to an oncoming log.

13. The combination set forth in claim 12 wherein said other surface is inclined at an angle of about 10° to the radial plane of said head in a rearwardly direction relative to an oncoming log.

14. In an apparatus for insuring the removal of bark from a log after such log has been acted upon by a bark-slitting machine, the combination comprising an annular rotor member, means for supporting said annular rotor member for rotation about its axis, means for rotating said annular rotor member, means for moving a log axially through said annular rotor member, a plurality of strippers, each said stripper having an edge extending generally axially, means for mounting each said stripper on said rotor member for yielding movement in a direction generally radially outwardly and rearwardly relative to an oncoming log, said latter means including means for maintaining the stripper edge of each stripper generally parallel to the axis of said rotor member throughout the radial movement of said stripper.

15. The combination set forth in claim 14 wherein said latter means includes a lever which is angularly inclined to the axis of the rotor and angularly inclined to a radial plane of said rotor and extends rearwardly and inwardly relative to an oncoming log.

References Cited in the file of this patent

UNITED STATES PATENTS

| 1,887,908 | Tidblad | Nov. 15, 1932 |
| 2,749,952 | League | June 12, 1956 |
| 2,775,274 | Andersson | Dec. 25, 1956 |
| 2,788,034 | Brundell et al. | Apr. 9, 1957 |
| 2,802,495 | Nicholson | Aug. 13, 1957 |
| 2,802,497 | Yeadon et al. | Aug. 13, 1957 |

FOREIGN PATENTS

| 145,439 | Sweden | May 25, 1954 |
| 154,715 | Sweden | June 5, 1956 |
| 747,112 | Great Britain | Mar. 28, 1956 |